US010869268B2

(12) United States Patent
Wu et al.

(10) Patent No.: US 10,869,268 B2
(45) Date of Patent: Dec. 15, 2020

(54) NR POWER SAVING ENHANCEMENTS

(71) Applicant: MediaTek Inc., Hsinchu (TW)

(72) Inventors: Wei-De Wu, Hsinchu (TW); Pei-Kai Liao, Hsinchu (TW); Chien-Hwa Hwang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/248,763

(22) Filed: Jan. 15, 2019

(65) Prior Publication Data

US 2019/0230590 A1    Jul. 25, 2019

Related U.S. Application Data

(60) Provisional application No. 62/619,219, filed on Jan. 19, 2018.

(51) Int. Cl.
*H04B 7/04*    (2017.01)
*H04W 52/02*   (2009.01)

(52) U.S. Cl.
CPC ... *H04W 52/0209* (2013.01); *H04W 52/0225* (2013.01); *H04W 52/0229* (2013.01); *H04W 52/0274* (2013.01)

(58) Field of Classification Search
None
See application file for complete search history.

(56) References Cited

U.S. PATENT DOCUMENTS

| 9,689,888 B2 * | 6/2017 | Becka | G01P 15/0802 |
| 9,985,711 B2 * | 5/2018 | Kim | H04B 7/0456 |
| 10,693,620 B2 * | 6/2020 | Zhou | H04W 72/0453 |
| 10,736,046 B2 * | 8/2020 | MolavianJazi | H04W 52/281 |
| 2015/0146658 A1 * | 5/2015 | Liu | H04L 5/0053 370/329 |
| 2016/0127991 A1 * | 5/2016 | Ang | H04W 52/0209 455/522 |
| 2017/0171841 A1 * | 6/2017 | Chen | H04L 5/0007 |
| 2017/0201393 A1 * | 7/2017 | Gaal | H04L 25/0204 |
| 2017/0272220 A1 * | 9/2017 | Chen | H04L 1/0027 |
| 2018/0199343 A1 * | 7/2018 | Deogun | H04L 5/0094 |
| 2018/0310300 A1 * | 10/2018 | Lin | H04W 72/0413 |
| 2019/0044811 A1 * | 2/2019 | Miao | H04L 41/0896 |
| 2019/0075585 A1 * | 3/2019 | Deogun | H04B 7/02 |

(Continued)

FOREIGN PATENT DOCUMENTS

CN            107172690 A       9/2017

OTHER PUBLICATIONS

3GPP TSG RAN #91, Reno, NV,USA,Nov. 27-Dec. 1 (Year: 2017).*

(Continued)

*Primary Examiner* — Sithu Ko
(74) *Attorney, Agent, or Firm* — Han IP PLLC; Andy M. Han (57) ABSTRACT

Techniques and examples of user equipment (UE) power saving enhancements in mobile communications are described. A UE establishes a wireless connection with a network node of a wireless network. The UE executes one or more procedures of a plurality of procedures related to bandwidth part (BWP) enhancement to improve power saving by the UE. The plurality of procedures include a time domain processing reduction procedure, a frequency domain processing reduction procedure, and a spatial domain processing reduction procedure.

18 Claims, 5 Drawing Sheets

(56) References Cited

U.S. PATENT DOCUMENTS

| | | | |
|---|---|---|---|
| 2019/0124558 A1* | 4/2019 | Ang | H04J 11/0076 |
| 2019/0141734 A1* | 5/2019 | Lei | H04W 72/1289 |
| 2019/0141742 A1* | 5/2019 | Zhou | H04L 5/005 |
| 2019/0215823 A1* | 7/2019 | Kim | H04L 1/18 |
| 2019/0230590 A1* | 7/2019 | Wu | H04W 52/0225 |
| 2019/0253933 A1* | 8/2019 | Wang | H04W 72/0446 |
| 2019/0261356 A1* | 8/2019 | Myung | H04L 1/1819 |
| 2019/0268912 A1* | 8/2019 | Myung | H04W 72/0446 |
| 2020/0252966 A1* | 8/2020 | Wu | H04W 74/0808 |

OTHER PUBLICATIONS

China National Intellectual Property Administration, International Search Report and Written Opinion for International Patent Application No. PCT/CN2019/072322, dated Apr. 8, 2019.

Qualcomm Incorporated, Open Issues on BWP, 3GPP TSG RAN WG1 #91, Reno, Nevada, USA, Nov. 27-Dec. 1, 2017.

Mediatek Inc., Fallback mechanism for Bandwidth part operation, 3GPP TSG-RAN WG2 Meeting #99, Berlin, Germany, Aug. 21-25, 2017.

* cited by examiner

ESTABLISH, BY A PROCESSOR OF A USER EQUIPMENT
(UE), A WIRELESS CONNECTION WITH A NETWORK NODE
OF A WIRELESS NETWORK
510

EXECUTE, BY THE PROCESSOR, ONE OR MORE
PROCEDURES OF A PLURALITY OF PROCEDURES
RELATED TO BANDWIDTH PART (BWP) ENHANCEMENT
TO IMPROVE POWER SAVING BY THE UE
THE PLURALITY OF PROCEDURES COMPRISE A TIME
DOMAIN PROCESSING REDUCTION PROCEDURE, A
FREQUENCY DOMAIN PROCESSING REDUCTION
PROCEDURE, AND A SPATIAL DOMAIN PROCESSING
REDUCTION PROCEDURE
520

FIG. 5

NR POWER SAVING ENHANCEMENTS

CROSS REFERENCE TO RELATED PATENT APPLICATION

The present disclosure claims the priority benefit of U.S. Provisional Patent Application No. 62/619,219, filed on 19 Jan. 2018, the content of which is herein incorporated by reference in its entirety.

TECHNICAL FIELD

The present disclosure is generally related to mobile communications and, more particularly, to power saving enhancements for a user equipment (UE) in mobile communications.

BACKGROUND

Unless otherwise indicated herein, approaches described in this section are not prior art to the claims listed below and are not admitted as prior art by inclusion in this section.

In terms of power saving for UEs in $5^{th}$-Generation (5G)/New Radio (NR) mobile communication systems, there is currently no clear solution in the $3^{rd}$-Generation Partnership Project (3GPP) specification for situations in which the amount of transmitted data is small or sporadic (with no data most of time and occasional data of small size(s)). In some approaches, a wake-up signal (WUS) for use in conjunction with a discontinuous reception (DRX) function is proposed. That is, before the DRX function is turned on, a set of reference signals (RS) can be provided for UE pre-synchronization as well as indication of whether data is scheduled by its presence. Also, when DRX is not in effect, a UE is allowed to enter a sleep mode for a very long time if there is no data transmission scheduled, and this could be beneficial in power saving in case WUS monitoring only consumes a small amount of power. However, in real-world implementations, a typical UE tends to have frequency data of small size(s) after DRX is turned on which prevents the UE from entering the sleep mode. In such cases, WUS would be of no help.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a UE establishing a wireless connection with a network node of a wireless network. The method may also involve the processor executing one or more procedures of a plurality of procedures related to BWP enhancement to improve power saving by the UE. The plurality of procedures may include a time domain processing reduction procedure, a frequency domain processing reduction procedure, and a spatial domain processing reduction procedure.

In one aspect, an apparatus implementable in a UE may include a transceiver and a processor. The transceiver may be capable of wirelessly communicating with a network node of a wireless network via a multiple-input multiple-output (MIMO) wireless communication link. The processor may be capable of establishing, via the transceiver, a wireless connection with a network node of a wireless network. The processor may also be capable of executing one or more procedures of a plurality of procedures related to BWP enhancement to improve power saving by the UE. The plurality of procedures may include a time domain processing reduction procedure, a frequency domain processing reduction procedure, and a spatial domain processing reduction procedure.

It is noteworthy that, although description provided herein may be in the context of certain radio access technologies, networks and network topologies such as 5G/NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power saving enhancements for UEs in mobile communications (e.g., 5G/NR mobile communications). According to the present disclosure, a number of possible solutions may be implemented separately or jointly. That is, although these possible solutions may be described below separately, two or more of these possible solutions may be implemented in one combination or another.

With respect to power saving for UEs, NR offers a number of improvements. First, with respect to secondary component carrier (SCC) being activated but staying idle most of the time, NR provides improvement by channel bandwidth adaption (e.g., by using bandwidth part (BWP)). Secondly, with respect to frequent data of small size(s) in primary component carrier (PCC) causing ineffective DRX, NR provides improvement by cross-slot scheduling to reduce power of the slots without data scheduling. Thirdly, NR provides improvement by shortening physical downlink shared channel (PDSCH) and frequency-division multiplexing (FDM) in control symbols for data of small size(s) via downlink control indication (DCI). However, there are some remaining issues not addressed by NR under current 3GPP specification. For instance, PCC BWP is inefficient (e.g., with respect to issues relating to carrier aggregation (CA) and BWP). Moreover, DCI overhead tends to be large (e.g., 40-bit DCI versus 80-bit data).

Under various schemes proposed in the present disclosure, when the amount of transmitted data is small or sporadic, better UE receiver power saving may be achieved by implementing one or more of the proposed schemes separately or jointly. The various proposed schemes may pertain to various aspects, such as time domain processing reduction, frequency domain processing reduction, and space and/or antenna domain (herein interchangeably referred to as "spatial domain") processing reduction with respect to a UE.

Under a first proposed scheme in accordance with the present disclosure, which pertains to time domain processing reduction, a physical downlink control channel (PDCCH) monitoring period may be allowed to change in an event that a BWP timer is over or below a given timer threshold. For instance, a UE may be allowed to increase its PDCCH monitoring period in an event that the BWP timer is over or below the given timer threshold. Additionally, or alternatively, under the first proposed scheme, a UE may be allowed to enter a sleep mode in an event that there is no data for transmission. For instance, the UE may detect presence of aperiodic channel state information (CSI) in an event that data arrival and the aperiodic CSI are bundled via a higher-layer indication. Still additionally, or alternatively, under the first proposed scheme, the UE may be allowed to directly carry data of small size(s) in a control channel.

Under a second proposed scheme in accordance with the present disclosure, which pertains to frequency domain processing reduction, BWP fallback to a relatively small bandwidth (BW) for a data of small size(s) may be allowed. Moreover, BWP timer steps may be utilized for data of small size(s) (e.g., when transport block size (TBS) is much less than a given threshold).

Under a third proposed scheme in accordance with the present disclosure, which pertains to space and/or antenna domain processing reduction, a UE may be allowed to apply a smaller number of receiver antennas by indicating a maximum number of multiple-input multiple-output (MIMO) layers in a BWP configuration. For instance, BWP switching may be utilized to dynamically switch the maximum number of MIMO layers according to different traffic statistics. Additionally, or alternatively, under the third proposed scheme, a single-port demodulation reference signal (DMRS) may be defined to reduce reference signal (RS) processing and RS resource occupation for mini-slots.

In view of the above, it may be summarized that UE power saving in 5G/NR mobile communications can be achieved through one or more approaches of BWP enhancement. Under a first approach of BWP enhancement, an indication of bundled aperiodic channel state information reference signal (CSI-RS) and data arrival may be provided. With such indication a priori, a UE may enter a sleep mode in an event that absence of the bundled aperiodic CSI-RS (which means no data arrival) is detected. Moreover, such indication may be provided on a per-BWP basis.

Under a second approach of BWP enhancement, a PDCCH monitoring period may be adapted according to the BWP timer. For instance, the PDCCH monitoring period for a UE may be increased in an event that the BWP timer reaches a predetermined time threshold before expiration.

Under a third approach of BWP enhancement, the maximum number of MIMO layers may be set as a per-BWP configuration. For instance, a UE may have the a priori on the maximum number of MIMO layers supported under an indicated or active BWP. Moreover, when the maximum number of MIMO layers is small (e.g., one or two), the UE may have the flexibility to apply one or two receive (RX) antennas.

Time Domain Processing Reduction

Figure 1:
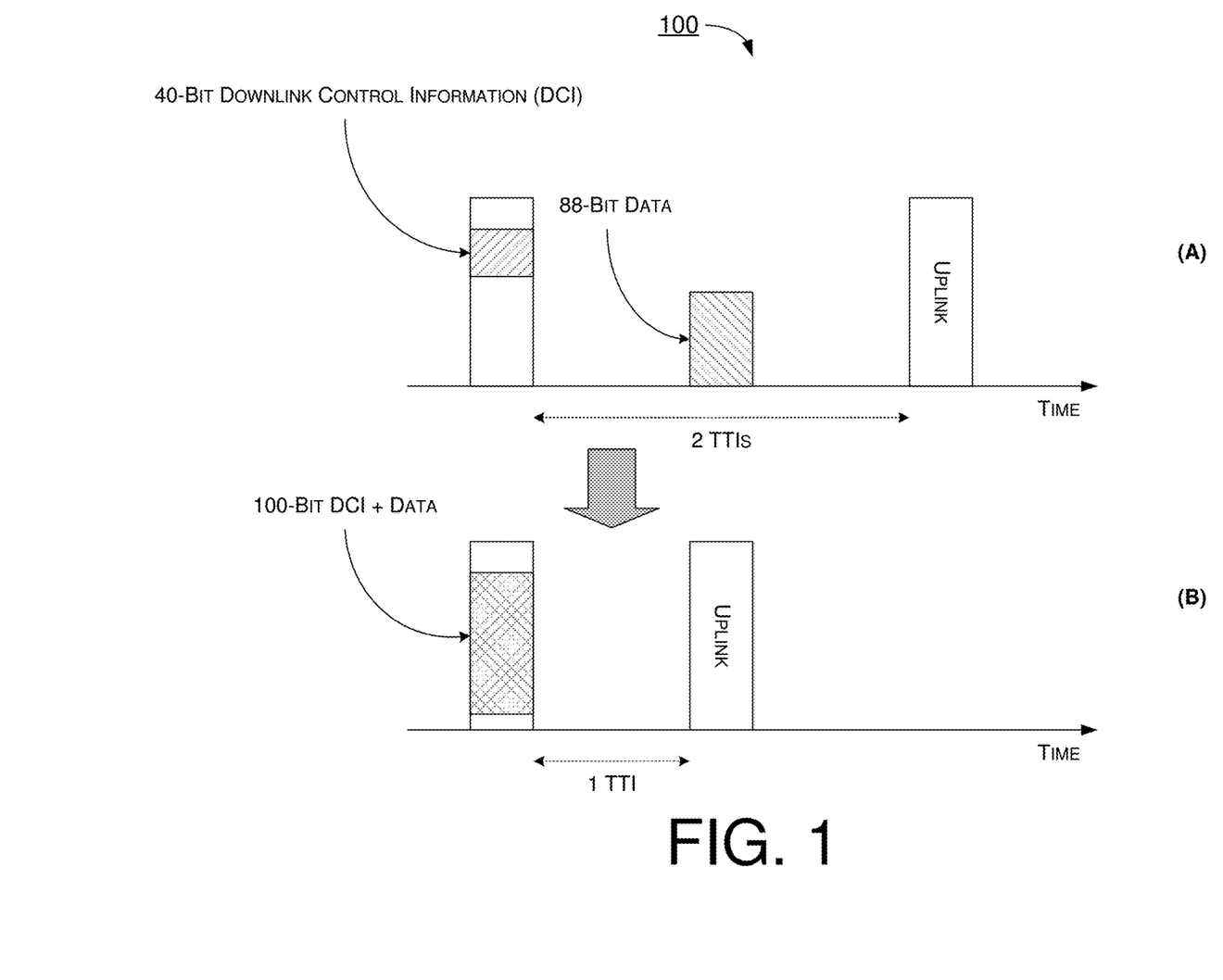
FIG. 1 is a diagram of an example scenario of power saving enhancement with time domain processing reduction in accordance with an implementation of the present disclosure.

FIG. 1 illustrates an example scenario 100 of power saving enhancement with time domain processing reduction in accordance with an implementation of the present disclosure. In scenario 100, time domain processing reduction may involve reduction in control overhead and latency for data of small size(s). Under a proposed scheme, data of small size(s) (e.g., up to 128 bits) may be carried by PDCCH to achieve reduced DCI and cyclic redundancy check (CRC) overhead. For example and without limitation, such data of small size(s) may include, for example and without limitation, keep-sync messages, voice session identifier (SID), paging messages, medium access control (MAC) control elements (CEs) and/or higher-layer commands. Part (A) of FIG. 1 shows a timeline of downlink (DL) transmission of DCI and data (from a network to a UE) as well as uplink (UL) transmission (from the UE to the network) under current 3GPP specification for NR. Part (B) of FIG. 1 shows a timeline of DL and UL transmissions with power saving enhancements in accordance with the present disclosure.

Referring to FIG. 1, instead of transmitting a 40-bit DCI and data of a small size (e.g., 88 bits) separately, the 88-bit data may be carried by PDCCH to be transmitted together with the DCI. As shown in FIG. 1, under the proposed scheme, the duration between the transmission of DCI to a UE over PDCCH and a subsequent UL transmission by the UE may be decreased (e.g., from 2 transmission time intervals (TTIs) to 1 TTI).

Moreover, under the proposed scheme, reduced latency may be achieved since PDSCH reception time is eliminated. This may be especially helpful for higher-layer commands and the like. It is noteworthy that, instant slot scheduling may require continual reception on PDSCH symbols before PDCCH is decoded, since PDSCH duration is not known beforehand. Furthermore, under the proposed scheme, reduced UE power consumption may be achieved. As it may be power-inefficient for a UE to turn on a big low-density parity check (LDPC) decoder for data of small size(s), the UE may enable big data MIMO and data CE. For instance, to achieve improved latency, efficiency and performance, polar coding for encoder and/or decoder in lieu of LDPC may be utilized by a UE for codeblock sizes of no more than a predefined size (e.g., 256 bits). Additionally, under the proposed scheme, DCI location may be associated to PDSCH location to reduce a large resource allocation (RA) field in the DCI.

Frequency Domain Processing Reduction

Figure 2:
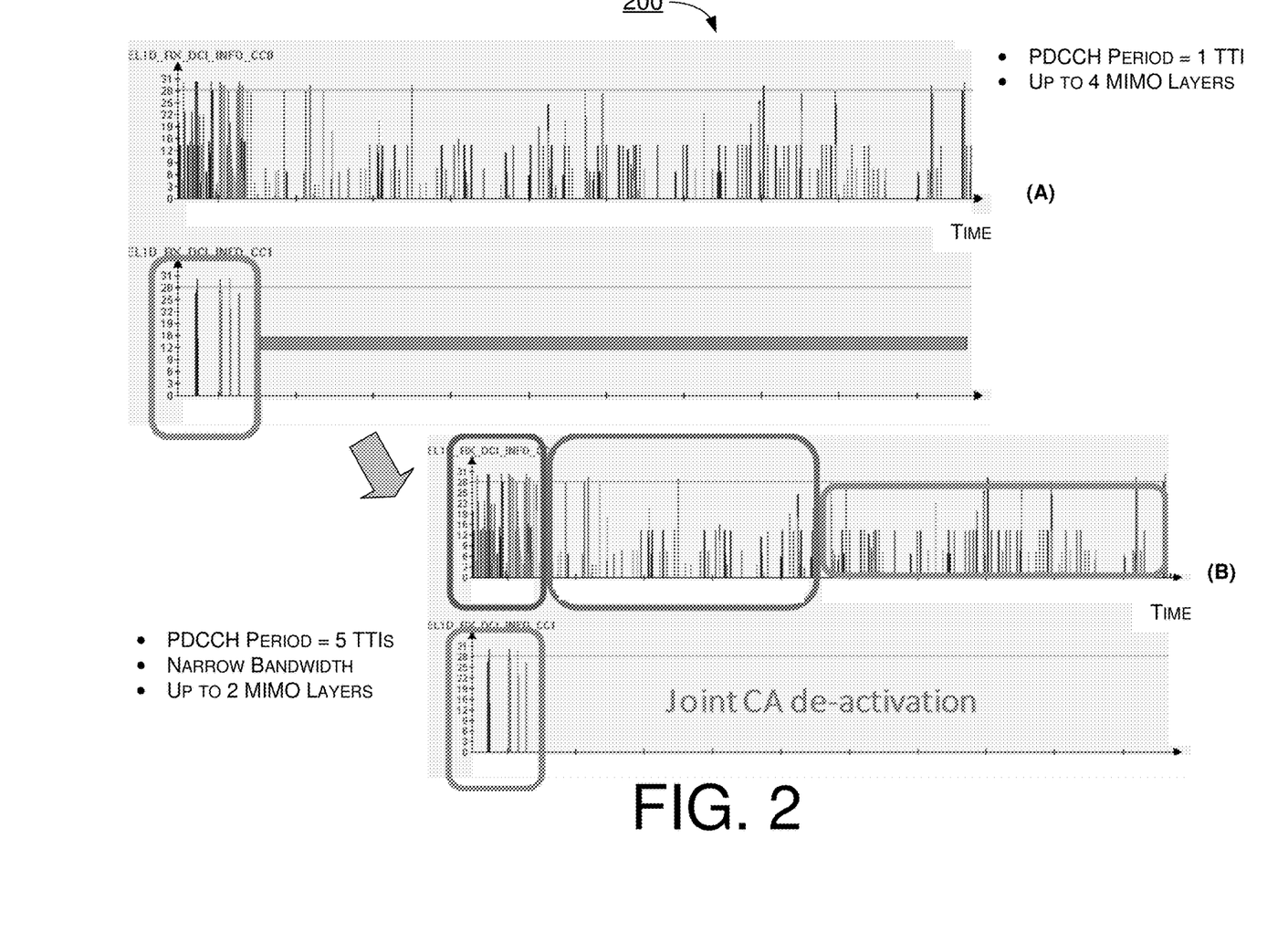
FIG. 2 is a diagram of an example scenario of power saving enhancement with frequency domain processing reduction in accordance with an implementation of the present disclosure.

FIG. 2 illustrates an example scenario 200 of power saving enhancement with frequency domain processing reduction in accordance with an implementation of the present disclosure. In scenario 200, frequency domain processing reduction may involve BWP fallback enhancement for data of small size(s). Part (A) of FIG. 2 shows an example case under current 3GPP specification with a PDCCH having a period of 1 TTI and up to four MIMO layers. Part (B) of FIG. 2 shows an example case with power saving enhancements in accordance with the present disclosure, utilizing a PDCCH having a period of 5 TTIs and up to two MIMO layers in narrow bandwidth.

Under current 3GPP specification, BWP fallback involves fallback to a default or narrowband BWP for data of small size(s) if there is no scheduled data transmission after time $T_d$, which is configured by the network via radio resource control (RRC) signaling and can be up to 50 milliseconds (ms). Under a proposed scheme, small-data fallback may involve fallback to a default or narrowband BWP in an event that all TBSs are no more than a predetermined threshold x during time $T_d$. For instance, in some cases x>0 to enable default BWP for data of small size(s). Under the proposed scheme, power saving for PDCCH monitoring may be achieved by increasing PDCCH monitoring period to a predefined duration Y in an event that all TBSs are no more than a predetermined threshold x during time $T_c$, where $T_c$ may be user defined or set to equal to $T_d$. Additionally, wideband reception time may be decreased before narrowband BWP. Moreover, PDCCH monitoring period may be restored to a default or original duration whenever a TBS is greater than x. It is noteworthy that the above features under the proposed scheme for frequency domain processing reduction may be applicable to both DL and UL transmissions.

Additionally, under the proposed scheme, a maximum layer number may be included as a BWP parameter. Thus, for default and/or narrowband BWP, a smaller layer number may be applied for a targeted lower data rate. Moreover, under the proposed scheme, joint BWP and CA switching may be performed, and a DCI-triggered BWP switching may also be used for indication (e.g., SCC activation and/or deactivation).

Space/Antenna Domain Processing Reduction

Figure 3:
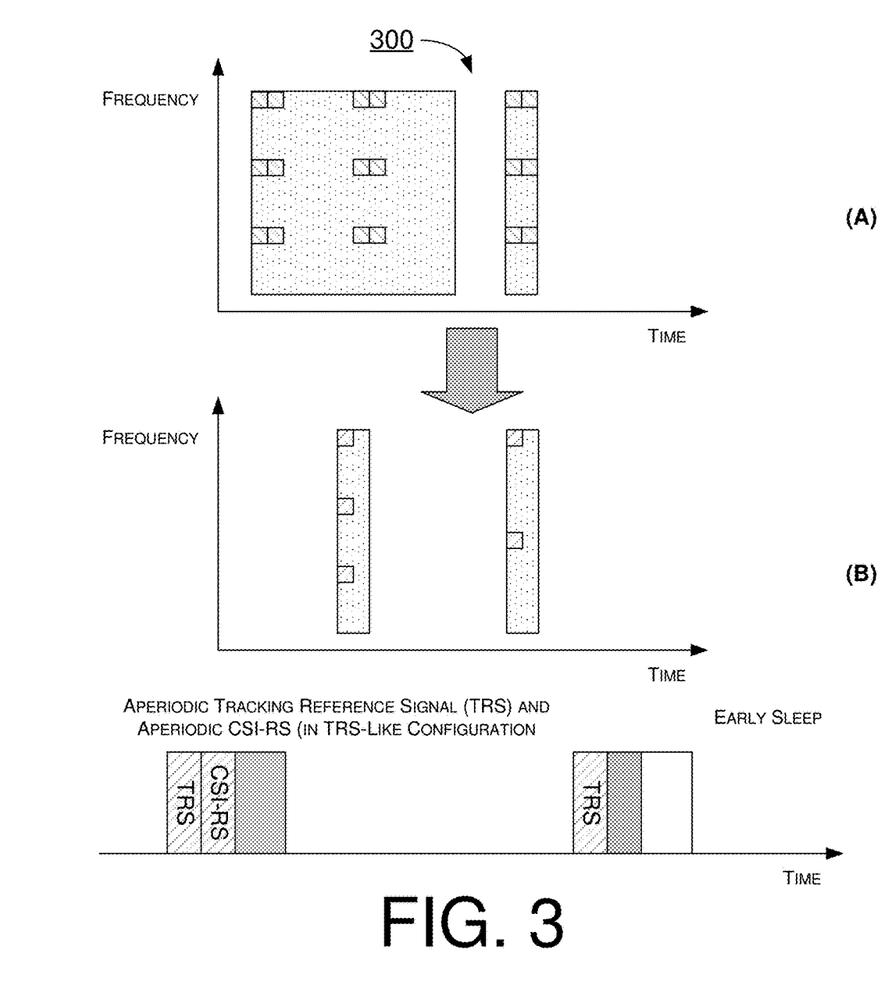
FIG. 3 is a diagram of an example scenario of power saving enhancement with space and/or antenna domain processing reduction in accordance with an implementation of the present disclosure.

FIG. 3 illustrates an example scenario 300 of power saving enhancement with space and/or antenna domain processing reduction in accordance with an implementation of the present disclosure. In scenario 300, space/antenna domain processing reduction may involve on-demand reference signal (RS) design which may include, for example and without limitation, RS design for short PDSCH (e.g., mini-slots) and assisting UE for a DRX-on duration. Part (A) of FIG. 3 shows an example case of resource allocation of resource elements (REs) under current 3GPP specification. Part (B) of FIG. 3 shows an example case of resource allocation of REs with power saving enhancements in accordance with the present disclosure, utilizing single-port DMRS.

Regarding RS design for short PDSCH, RS overhead may become large with shorter data region, and this is a fundamental issue to be resolved. Under a proposed scheme, RS design for short PDSCH may involve reduced DMRS for one-layer transmission. Under current 3GPP specification, one-port and two-port DMRS occupy the same number of REs. Under the proposed scheme, single-port DMRS may be defined with fewer RS REs. Moreover, under the proposed scheme, lower RS density may be utilized for millimeter-wave (mmWave) signals. In mmWave, wireless communication channels may be more frequency-flat by virtue of beamforming, thus smaller density may be feasible.

Regarding assisting UE for a DRX-on duration, synchronization and early sleep may be utilized under the proposed scheme. With respect to synchronization, aperiodic tracking reference signal (TRS) and CSI-RS in may be bundled in a TRS-like configuration. Additionally, under the proposed scheme, CSI-RS may be used for CSI reporting. With respect to early sleep, a UE may receive an indication from a network to enter a sleep mode. The indication may be in the form of MAC CE in a low-latency setting (e.g., carried by PDCCH). For instance, early sleep for power saving enhancement for a UE may be triggered in the presence of aperiodic CSI-RS.

Illustrative Implementations

Figure 4:
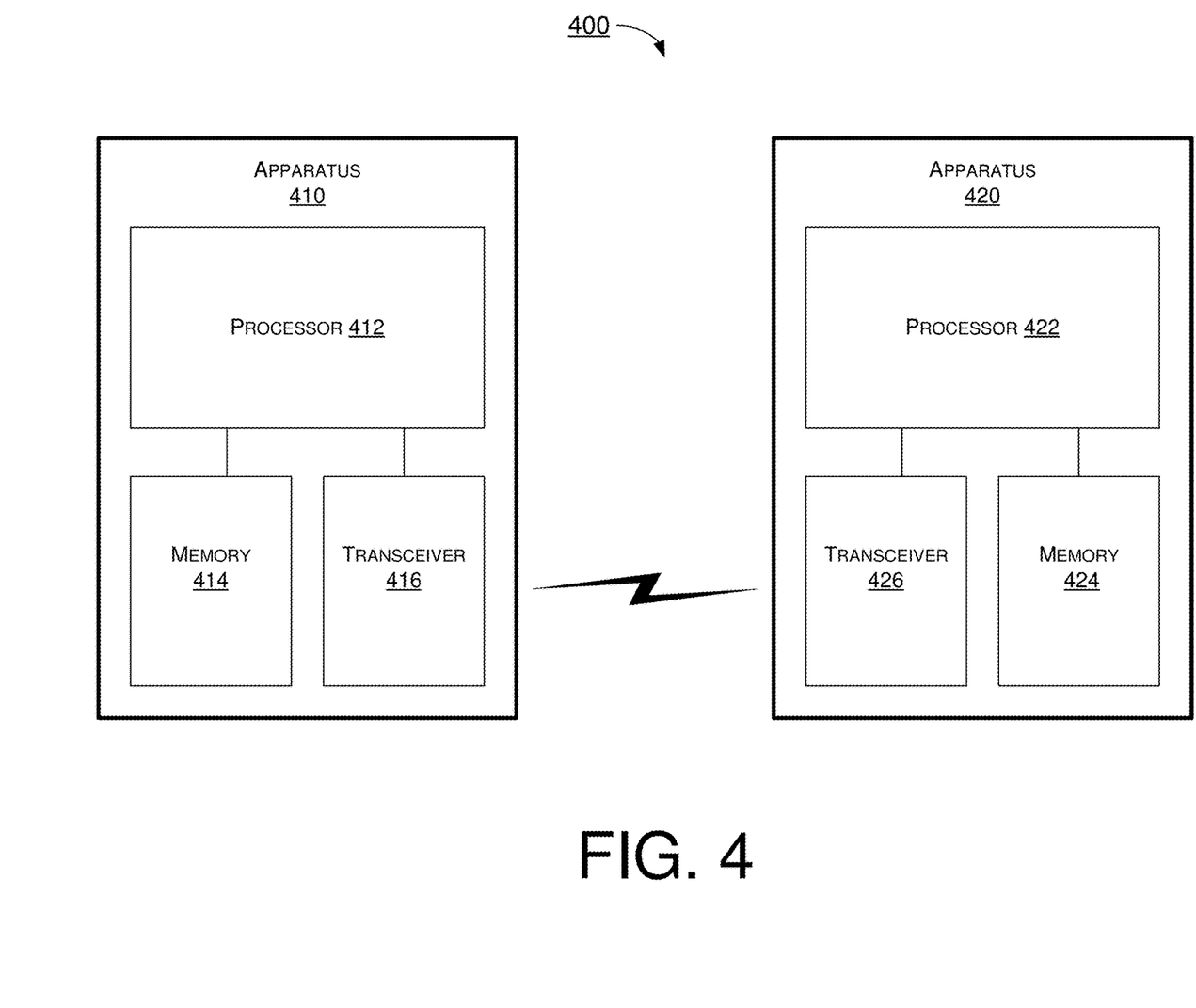
FIG. 4 is a block diagram of an example system in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to power saving enhancements for UEs in mobile communications, including the various schemes described above with respect to various proposed designs, concepts, schemes, systems and methods described above as well as processes 400 and 600 described below.

Each of apparatus 410 and apparatus 420 may be a part of an electronic apparatus, which may be a network apparatus or a UE, such as a portable or mobile apparatus, a wearable apparatus, a wireless communication apparatus or a computing apparatus. For instance, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to power saving enhancements for UEs in mobile communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be equipped with a plurality of antenna ports (not shown) such as, for example, four antenna ports. That is, transceiver 416 may be equipped with multiple transmit antennas and multiple receive antennas for MIMO wireless communications. In some implementations, apparatus 420 may also include a transceiver 426 coupled to processor 422. Transceiver 426 may include a transceiver capable of wirelessly transmitting and receiving data. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE, and apparatus 420, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 410 as a UE, the same is also applicable to apparatus 420 as a base station (e.g., gNB or TRP).

Under various proposed schemes in accordance with the present disclosure, processor 412 of apparatus 410 may establish wireless communication with apparatus 420 as a network node of a wireless network (e.g., 5G/NR mobile network). Processor 412 may execute one or more procedures of a plurality of procedures related to BWP enhancement to improve power saving by the UE, with the plurality of procedures including one or more time domain processing reduction procedures, one or more frequency domain processing reduction procedures, and one or more spatial domain processing reduction procedures.

In some implementations, in executing the one or more procedures, processor 412 may be capable of executing one of the one or more time domain processing reduction procedures. Moreover, in executing the one of the one or more time domain processing reduction procedures, processor 412 may be capable of increasing a PDCCH monitoring period in an event that a BWP timer reaches a predetermined threshold before expiration.

In some implementations, in executing the one of the one or more time domain processing reduction procedures, processor 412 may be capable of entering a sleep mode in an event that there is no data for reception or transmission.

In some implementations, in executing the one of the one or more time domain processing reduction procedures, processor 412 may be capable of detecting presence of an aperiodic CSI-RS bundled with data presence.

In some implementations, in executing the one of the one or more time domain processing reduction procedures, processor 412 may be capable of: (a) receiving, via transceiver 416, data of a small size together with DCI over a PDCCH from apparatus 420; and (b) performing polar coding on the data in an event that a codeblock size of the data is no more than a predefined size.

In some implementations, a data location may be associated to a resource allocation (RA) field or another DCI format. In some implementations, the data may include a keep-sync message, a voice SID, a paging message, a MAC CE, a higher-layer command, or a combination thereof.

In some implementations, a size of the data may be no more than 128 bits.

In some implementations, in executing the one or more procedures, processor 412 may be capable of executing one of the one or more frequency domain processing reduction procedures. Moreover, in executing the one of the one or more frequency domain processing reduction procedures, processor 412 may be capable of: (a) receiving, via transceiver 416, RRC signaling from apparatus 420 indicating a time duration and a data size threshold; and (b) performing BWP fallback to a default or narrowband bandwidth for data of a small size in an event that there is no scheduled data of a size larger than the data size threshold during the indicated time duration after a data arrival.

In some implementations, in executing the one or more procedures, processor 412 may be capable of executing one of the one or more spatial domain processing reduction procedures. Moreover, in executing the one of the one or more spatial domain processing reduction procedures, processor 412 may be capable of: (a) setting a maximum number of MIMO layers on a per-BWP basis for one or more BWPs; and (b) performing, via transceiver 416, MIMO wireless communications with the network node using the maximum number of MIMO layers in an active BWP among the one or more BWPs.

In some implementations, in an event that the maximum number of MIMO layers is one or two, processor 412 may be capable of performing the MIMO wireless communications with the network node by utilizing one or two receive (RX) antennas of transceiver 416 in the MIMO wireless communications.

Illustrative Processes

Figure 5:
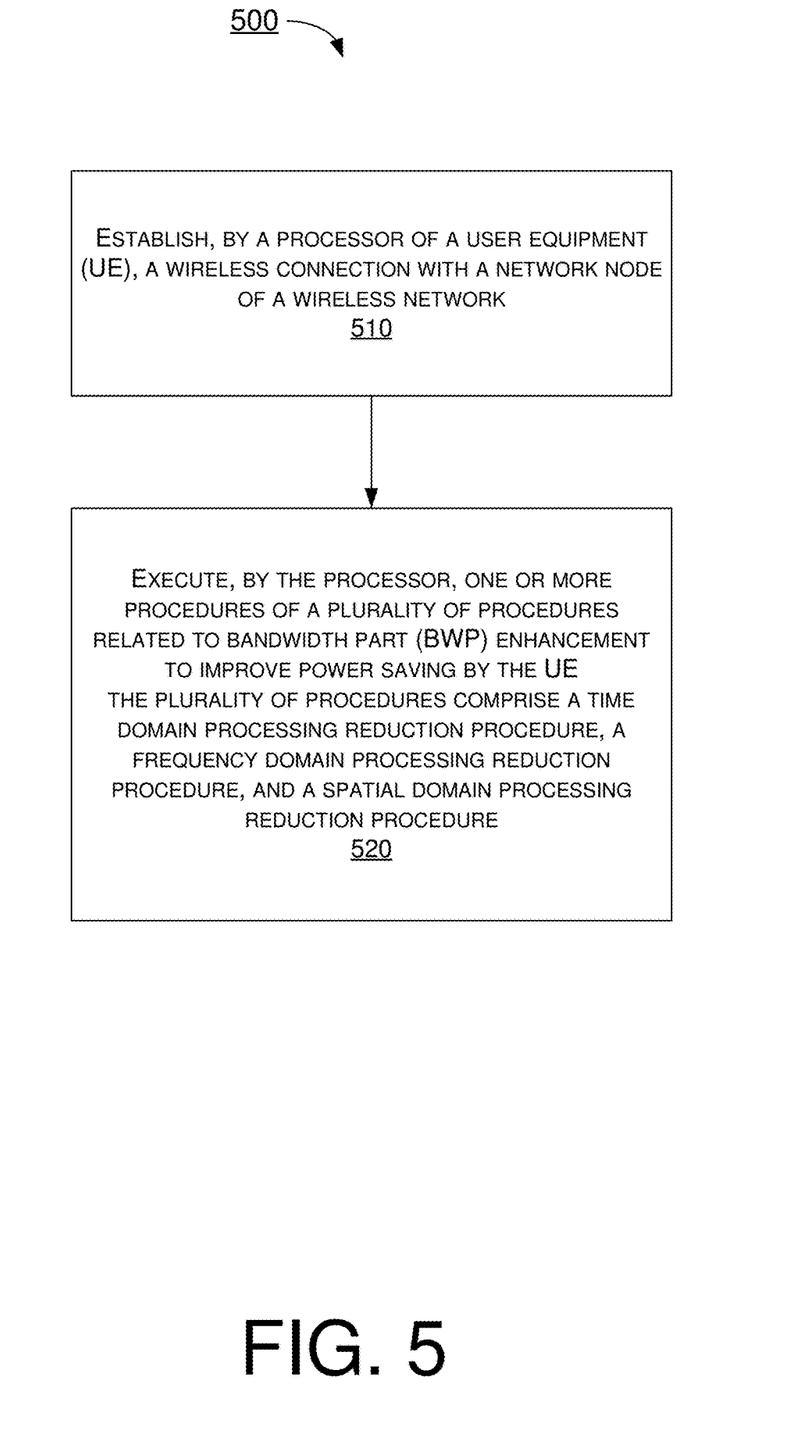
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to power saving enhancements for UEs in mobile communications. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. The blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE and apparatus 420 as a base station. Process 500 may begin at block 510.

At 510, process 500 may involve processor 412 of apparatus 410 establishing, via transceiver 416, wireless connection with apparatus 420 as a network node of a wireless network (e.g., 5G/NR mobile network). Process 500 may proceed from 510 to 520.

At 520, process 500 may involve processor 412 executing one or more procedures of a plurality of procedures related to BWP enhancement to improve power saving by apparatus 410. The plurality of procedures may include one or more time domain processing reduction procedures, one or more frequency domain processing reduction procedures, and one or more spatial domain processing reduction procedures.

In some implementations, in executing the one or more procedures, process 500 may involve processor 412 executing one of the one or more time domain processing reduction procedures. Moreover, in executing the one of the one or more time domain processing reduction procedures, process 500 may involve processor 412 increasing a PDCCH monitoring period in an event that a BWP timer reaches a predetermined threshold before expiration.

In some implementations, in executing the one or more procedures, process 500 may involve processor 412 executing one of the one or more time domain processing reduction procedures. Moreover, in executing the one of the one or more time domain processing reduction procedures, process 500 may involve processor 412 entering a sleep mode in an event that there is no data for reception of transmission.

In some implementations, in executing the one or more procedures, process 500 may involve processor 412 executing the time domain processing reduction procedure. Moreover, in executing the one of the one or more time domain processing reduction procedures, process 500 may involve processor 412 detecting presence of an aperiodic CSI-RS bundled with data presence.

In some implementations, in executing the one or more procedures, process 500 may involve processor 412 executing one of the one or more time domain processing reduction procedures. Moreover, in executing the one of the one or more time domain processing reduction procedures, process 500 may involve processor 412 receiving, from apparatus 420, data of a small size together with DCI over a PDCCH. In some implementations, in executing the one of the one or more time domain processing reduction procedures, process 500 may further involve processor 412 performing polar coding on the data in an event that a codeblock size of the data is no more than a predefined size.

In some implementations, a data location may be associated to a resource allocation (RA) field or another DCI format.

In some implementations, the data may include a keep-sync message, a voice SID, a paging message, a MAC CE, a higher-layer command, or a combination thereof.

In some implementations, a size of the data may be no more than 128 bits.

In some implementations, in executing the one or more procedures, process 500 may involve processor 412 executing one of the one or more frequency domain processing reduction procedures. Moreover, in executing the one of the one or more frequency domain processing reduction procedures, process 500 may involve processor 412 performing a number of operations. For instance, process 500 may involve processor 412 receiving, from apparatus 420, RRC signaling that indicates a time duration and a data size threshold. Additionally, process 500 may involve processor 412 performing BWP fallback to a default or narrowband bandwidth for data of a small size in an event that there is no scheduled data of a size larger than the data size threshold during the indicated time duration after a data arrival.

In some implementations, in executing the one or more procedures, process 500 may involve processor 412 executing one of the one or more spatial domain processing reduction procedures. Moreover, in executing the one of the one or more spatial domain processing reduction procedures, process 500 may involve processor 412 performing a number of operations. For instance, process 500 may involve processor 412 setting a maximum number of MIMO layers on a per-BWP basis for one or more BWPs. Additionally, process 500 may involve processor 412 performing MIMO wireless communications with the network node using the maximum number of MIMO layers in an active BWP among the one or more BWPs.

In some implementations, in an event that the maximum number of MIMO layers is one or two, in performing the MIMO wireless communications with the network node, process 500 may involve processor 412 utilizing one or two RX antennas in the MIMO wireless communications.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    establishing, by a processor of a user equipment (UE), a wireless connection with a network node of a wireless network; and
    executing, by the processor, one or more procedures of a plurality of procedures related to bandwidth part (BWP) enhancement to improve power saving by the UE,
    wherein the plurality of procedures comprise a time domain processing reduction procedure, a frequency domain processing reduction procedure, and a spatial domain processing reduction procedure, and
    wherein the executing of the one or more procedures comprises executing the spatial domain processing reduction procedure by:
        setting a maximum number of multiple-input multiple-output (MIMO) layers on a per-BWP basis for one or more BWPs; and
        performing MIMO wireless communications with the network node using the maximum number of MIMO layers in an active BWP among the one or more BWPs.

2. The method of claim 1, wherein the executing of the one or more procedures further comprises executing the time domain processing reduction procedure, and wherein the executing of the time domain processing reduction procedure comprises increasing a physical downlink control channel (PDCCH) monitoring period in an event that a BWP timer reaches a predetermined threshold before expiration.

3. The method of claim 1, wherein the executing of the one or more procedures further comprises executing the time domain processing reduction procedure, and wherein the executing of the time domain processing reduction procedure comprises entering a sleep mode in an event that there is no data for reception or transmission.

4. The method of claim 3, wherein the executing of the time domain processing reduction procedure further comprises detecting presence of an aperiodic channel state information (CSI) reference signal (CSI-RS) bundled with data presence.

5. The method of claim 1, wherein the executing of the one or more procedures further comprises executing the time domain processing reduction procedure, and wherein the executing of the time domain processing reduction procedure comprises receiving, from the network node, data of a small size together with downlink control information (DCI) over a physical downlink control channel (PDCCH).

6. The method of claim 5, wherein the executing of the time domain processing reduction procedure further comprises performing polar coding on the data in an event that a codeblock size of the data is no more than a predefined size.

7. The method of claim 5, wherein a data location is associated to a resource allocation (RA) field or another DCI format.

8. The method of claim 5, wherein the data comprises a keep-sync message, a voice session identifier (SID), a paging message, a medium access control (MAC) control element (CE), a higher-layer command, or a combination thereof.

9. The method of claim 1, wherein the executing of the one or more procedures further comprises executing the frequency domain processing reduction procedure, and wherein the executing of the frequency domain processing reduction procedure comprises:
receiving, from the network node, radio resource control (RRC) signaling that indicates a time duration and a data size threshold; and
performing BWP fallback to a default or narrowband bandwidth for data of a small size in an event that there is no scheduled data of a size larger than the data size threshold during the indicated time duration after a data arrival.

10. The method of claim 1, wherein, in an event that the maximum number of MIMO layers is one or two, the performing of the MIMO wireless communications with the network node comprises utilizing one or two receive (RX) antennas in the MIMO wireless communications.

11. An apparatus implemented in a user equipment (UE), comprising:
a transceiver configured to wirelessly communicate with a network node of a wireless network via a multiple-input multiple-output (MIMO) wireless communication link; and
a processor coupled to the transceiver, the processor configured to perform operations comprising:
establishing, via the transceiver, a wireless connection with a network node of a wireless network; and
executing one or more procedures of a plurality of procedures related to bandwidth part (BWP) enhancement to improve power saving by the UE,
wherein the plurality of procedures comprise a time domain processing reduction procedure, a frequency domain processing reduction procedure, and a spatial domain processing reduction procedure, and
wherein, in executing the one or more procedures, the processor is configured to execute the spatial domain processing reduction procedure by:
setting a maximum number of multiple-input multiple-output (MIMO) layers on a per-BWP basis for one or more BWPs; and
performing, via the transceiver, MIMO wireless communications with the network node using the maximum number of MIMO layers in an active BWP among the one or more BWPs.

12. The apparatus of claim 11, wherein, in executing the one or more procedures, the processor is further configured to execute the time domain processing reduction procedure, and wherein, in executing the time domain processing reduction procedure, the processor is configured to increase a physical downlink control channel (PDCCH) monitoring period in an event that a BWP timer reaches a predetermined threshold before expiration.

13. The apparatus of claim 11, wherein, in executing the one or more procedures, the processor is further configured to execute the time domain processing reduction procedure, and wherein, in executing the time domain processing reduction procedure, the processor is configured to enter a sleep mode in an event that there is no data for reception or transmission.

14. The apparatus of claim 11, wherein, in executing the one or more procedures, the processor is further configured to execute the time domain processing reduction procedure, and wherein, in executing the time domain processing reduction procedure, the processor is configured to detect presence of an aperiodic channel state information (CSI) reference signal (CSI-RS) bundled with data presence.

15. The apparatus of claim 11, wherein, in executing the one or more procedures, the processor is further configured to execute the time domain processing reduction procedure by performing operations comprising:
receiving, via the transceiver, data of a small size together with downlink control information (DCI) over a physical downlink control channel (PDCCH) from the network node; and
performing polar coding on the data in an event that a codeblock size of the data is no more than a predefined size.

16. The apparatus of claim 15, wherein a data location is associated to a resource allocation (RA) field or another DCI format, and wherein the data comprises a keep-sync message, a voice session identifier (SID), a paging message, a medium access control (MAC) control element (CE), a higher-layer command, or a combination thereof.

17. The apparatus of claim 11, wherein, in executing the one or more procedures, the processor is further configured to execute the frequency domain processing reduction procedure, and wherein, in executing the frequency domain processing reduction procedure, the processor is configured to perform operations comprising:
receiving, via the transceiver, radio resource control (RRC) signaling from the network node indicating a time duration and a data size threshold; and
performing BWP fallback to a default or narrowband bandwidth for data of a small size in an event that there is no scheduled data of a size larger than the data size threshold during the indicated time duration after a data arrival.

18. The method of claim 11, wherein, in an event that the maximum number of MIMO layers is one or two, the processor is configured to perform the MIMO wireless communications with the network node by utilizing one or two receive (RX) antennas of the transceiver in the MIMO wireless communications.

* * * * *